(12) United States Patent
Yang et al.

(10) Patent No.: US 7,352,503 B2
(45) Date of Patent: Apr. 1, 2008

(54) TWO-PARTICLE ELECTROPHORETIC INK FOR MICROENCAPSULATED FLEXIBLE ELECTRONIC DISPLAY

(75) Inventors: San-Ming Yang, Mississauga (CA);
Naveen Chopra, Oakville (CA);
Gabriel Iftime, Mississauga (CA);
Ahmed Alzamly, Mississauga (CA);
Man-Chung Tam, Mississauga (CA);
Peter Kazmaier, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 90 days.

(21) Appl. No.: 11/165,231

(22) Filed: Jun. 24, 2005

(65) Prior Publication Data
US 2006/0291033 A1 Dec. 28, 2006

(51) Int. Cl.
*G02B 26/00* (2006.01)
(52) U.S. Cl. .................................. 359/296; 345/107
(58) Field of Classification Search ............... 359/296; 345/107
See application file for complete search history.

(56) References Cited

U.S. PATENT DOCUMENTS

| | | | |
|---|---|---|---|
| 5,961,804 A * | 10/1999 | Jacobson et al. | 359/296 |
| 6,517,618 B2 | 2/2003 | Foucher et al. | |
| 6,727,881 B1 | 4/2004 | Albert et al. | |
| 6,839,158 B2 | 1/2005 | Albert et al. | |
| 6,846,377 B2 | 1/2005 | Biegelsen et al. | |
| 2006/0222976 A1 * | 10/2006 | Yang et al. | 430/32 |

OTHER PUBLICATIONS

Wikipedia article for NYLON (Internet website: en.wikipedia.org/wiki/Nylon).*
Diaz et al., "A semi-quantitative tribo-electric series for polymeric materials: the influence of chemical structure and properties," Journal of Electrostatics 62 (2004), pp. 277-290.*

* cited by examiner

*Primary Examiner*—Evelyn A. Lester
(74) *Attorney, Agent, or Firm*—MH2 Technology Law Group LLP

(57) ABSTRACT

Exemplary electrophoretic ink capsules for electrophoretic displays, and methods for making the exemplary electrophoretic ink capsules are disclosed. In various embodiments, the electrophoretic ink capsules can include triboelectrically charged electrophoretic particles having higher electrical conductivity than conventionally charged electrophoretic particles allowing fabrication of electrophoretic displays with lower switching fields and faster response times.

13 Claims, 3 Drawing Sheets

TWO-PARTICLE ELECTROPHORETIC INK FOR MICROENCAPSULATED FLEXIBLE ELECTRONIC DISPLAY

FIELD OF THE INVENTION

The present teachings relate to electrophoretic displays and, more particularly, relates to eletrophoretic ink and methods for making electrophoretic ink for encapsulated electrophoretic displays.

BACKGROUND OF THE INVENTION

An electrophoretic display is a flexible display having many attributes of a paper document. For example, it can look like paper, have ambient light valve behavior like paper (i.e. the brighter the ambient light, the more easily it may be seen), be flexible like paper, be carried around like paper, be written on like paper, be copied like paper, and have nearly the archival memory of paper.

Encapsulated electrophoretic displays typically consist of a polymeric binder surrounding ink capsules. The ink capsules or "electrophoretic ink" have electrophoretic particles and a liquid within. The particles are of two types, one type that substantially reflects light and another type that absorbs light. A pair of electrodes is located adjacent the binder to apply an electric field. Application of one electric field causes the particles to orient so that the capsules reflect light. Application of another electric field causes the particles to orient so that the capsules absorb light.

In order to respond to the electric field, the electrophoretic particles are charged. Problems arise, however, because conventional electrophoretic ink requires a complex mixture of ionic charge additives and ionic charge control agents in addition to the pigments, dispersants, and solvents. Moreover, the presence of those ionic additives results in a highly charged electrophoretic ink that requires a high switching field to move the particles within the capsules.

Thus, there is a need to overcome these and other problems of the prior art to provide an electrophoretic ink that can be used in an electrophoretic display having a low switching field and a fast response time.

SUMMARY OF THE INVENTION

According to various embodiments, the present teachings include an electrophoretic ink capsule including a first plurality of triboelectrically charged particles, a second plurality of triboelectrically particles, and a non-polar liquid. The electrophoretic ink capsule can further include a shell encapsulating the first plurality of particles, the second plurality of particles, and the non-polar liquid, wherein the first plurality of triboelectrically charged particles move in a first direction within the non-polar liquid in response to an applied electric field and the second plurality of triboelectrically charged particles move in an opposite direction within the non-polar liquid in response to the applied electric field.

According to various other embodiments, the present teachings include a method for making electrophoretic ink capsules including forming a first plurality of charged particles having a first pigment by feeding a first pigmented polymer melt onto a spinning disk. A second plurality of charged particles having a second pigment can be formed by feeding a second pigmented polymer melt onto the spinning disk. A first plurality of fine particles can be formed by mechanically breaking up the first plurality of charged particle. A second plurality of fine particles can also be formed by mechanically breaking up the second plurality of charged particles. A plurality of electrophoretic ink capsules can be formed by encapsulating a portion of the first plurality of charged particles, a portion of the second plurality of charged particles, and a non-polar liquid.

In still further embodiments, the present teachings include an electrophoretic display including a first substrate and a conductive layer on the first substrate. The electrophoretic display can further include a first polyvinyl acetate layer comprising a plurality of electrophoretic ink capsules having an electrical conductivity of about $10^{-11}$ $Scm^{-1}$ or less. The electrophoretic ink capsules can comprise a shell encapsulating a plurality of triboelectrically charged dark particles, a plurality of triboelectrically charged light particles, and a non-polar liquid.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, not to be taken in a limited sense.

FIGS. 1-4 depict exemplary electrophoretic ink capsules for electrophoretic displays, and methods for making the exemplary electrophoretic ink capsules. In various embodiments, the electrophoretic ink capsules can include triboelectrically charged electrophoretic particles having higher electrical conductivity than conventionally charged electrophoretic particles allowing fabrication of electrophoretic displays with lower switching fields and faster response times.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

As used herein, the term "triboelectrically charged particles" refers to particles having a charge, either positive or negative, created by their contact and separation with another material.

Figure 1:
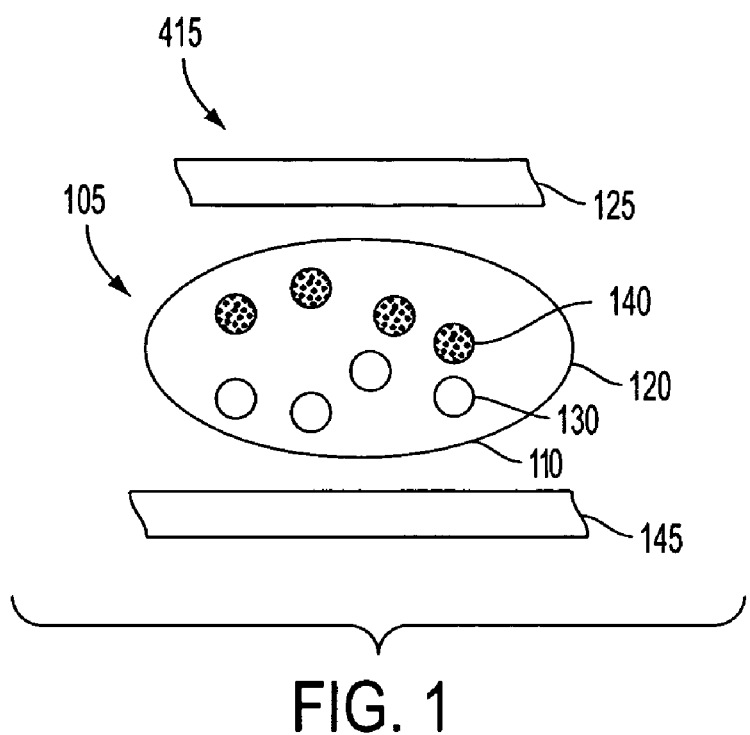
FIG. 1 depicts an exemplary eletrophoretic ink particle in accordance with the present teachings.

According to various embodiments, an exemplary electrophoretic ink capsule 105 is shown in FIG. 1. Electrophoretic ink capsule 105 can include a shell 110, a non-polar liquid 120, a first plurality of triboelectrically charged particles 130 and a second plurality of triboelectrically charged particles 140. In various embodiments, electrophoretic ink capsule 105 can have an electrical conductivity of about $10^{-11}$ Scm$^{-1}$ or less. Electrophoretic ink capsule 105 can further have a diameter of about 200 μm or less.

Shell 110 can encapsulate non-polar liquid 120, first plurality of particles 130, and second plurality of particles 140. Shell 110 can be spherical or non-spherical in shape. According to various embodiments, shell 100 can formed by, for example, interfacial polymerization, in situ polymerization, physical processes, such as coextrusion and other phase separation processes, in-liquid curing, and simple/complex coacervation.

Exemplary materials for shell 110 formed by a simple coacervation processes include, but are not limited to, gelatin, polyvinyl alcohol, polyvinyl acetate, and cellulosic derivatives, such as, for example, carboxymethylcellulose. Exemplary materials for shell 110 formed by a complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Exemplary materials for shell 110 formed by a phase separation processes include, but are not limited to, polystyrene, PMMA, polyethyl methacrylate, polybutyl methacrylate, ethyl cellulose, polyvinyl pyridine, and poly acrylonitrile. Exemplary materials for shell 110 formed by an in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, MMA, and acrylonitrile. Exemplary materials for shell 110 formed by an interfacial polymerization processes include, but are not limited to, diacyl chlorides, such as, for example, sebacoyl, adipoyl, and di- or poly-amines or alcohols, and isocyanates. Useful emulsion polymerization materials include, but are not limited to, styrene, vinyl acetate, acrylic acid, butyl acrylate, t-butyl acrylate, methyl methacrylate, and butyl methacrylate.

Non-polar liquid 120 can be selected, for example, based on properties such as density, refractive index, and solubility, and/or based on chemical inertness, density matching to plurality of electrophoretic particles 130 and 140, and/or chemical compatibility with both electrophoretic particles 130 and 140 and shell 110. According to various embodiments, non-polar liquid 120 can comprise a single fluid or a blend of more than one fluid.

According to various embodiments non-polar liquid 120 can be, for example, an organic liquid, such as halogenated organic liquid, a saturated linear or branched hydrocarbon, a silicone polymeric liquid. Examples of a hydrocarbon non-polar liquid 120 include, but are not limited to, dodecane, tetradecane, the aliphatic hydrocarbons in the Isopar RTM series (Exxon, Houston, Tex.), Norpar.RTM. (series of normal paraffinic oils), Shell-Sol.RTM. (Shell, Houston, Tex.), and Sol-Tro IRTM. (Shell, Houston, Tex.), naphtha, and other petroleum liquids. Examples of halogenated liquids are, but are not limited to, Halocarbon 0.8 and 1.8 from Halocarbon Inc. Examples of silicone polymeric liquids include, but are not limited to, DC200 from Dow Corning Inc.

First plurality of triboelectrically charged particles 130 and a second plurality of triboelectrically charged particles 140 can include a pigment and a polymer. According to various embodiments, the first plurality of triboelectrically charged particles 130 can be dark colored particles, such as, for example, light absorbing particles. Second plurality of charged particles 140 can be light colored particles, such as, for example, light reflecting particles.

Pigments can include, but are not limited to, PbCrO$_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Blac, CBS (E. I. du Pont de Nemours and Company, Inc., Wilmington, Del.), Crocein Scarlet N Ex (du Pont) (27290), Fiber Black VF (duPont) (30235), Luxol Fast Black L (duPont) (Solv. Black 17), Nirosine Base No. 424 (duPont) (50415 B), Oil Black BG (duPont) (Solv. Black 16), Rotalin Black RM (duPont), Sevron Brilliant Red 3 B (duPont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Blk. 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680), Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Blk. 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 μm), Statex B-12 (Columbian Carbon Co.) (a furnace black of 33 μm average particle size), and chrome green.

Figure 3A:
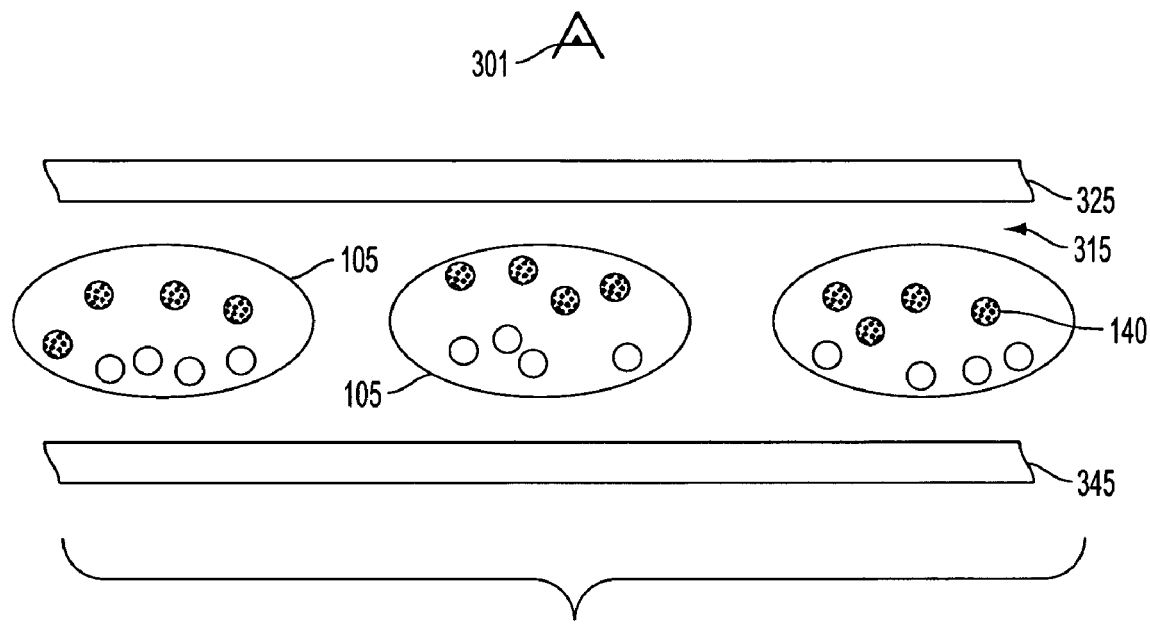
FIGS. 3A and 3B depict the movement of exemplary eletrophoretic ink particles in response to an electric field.
Figure 3B:
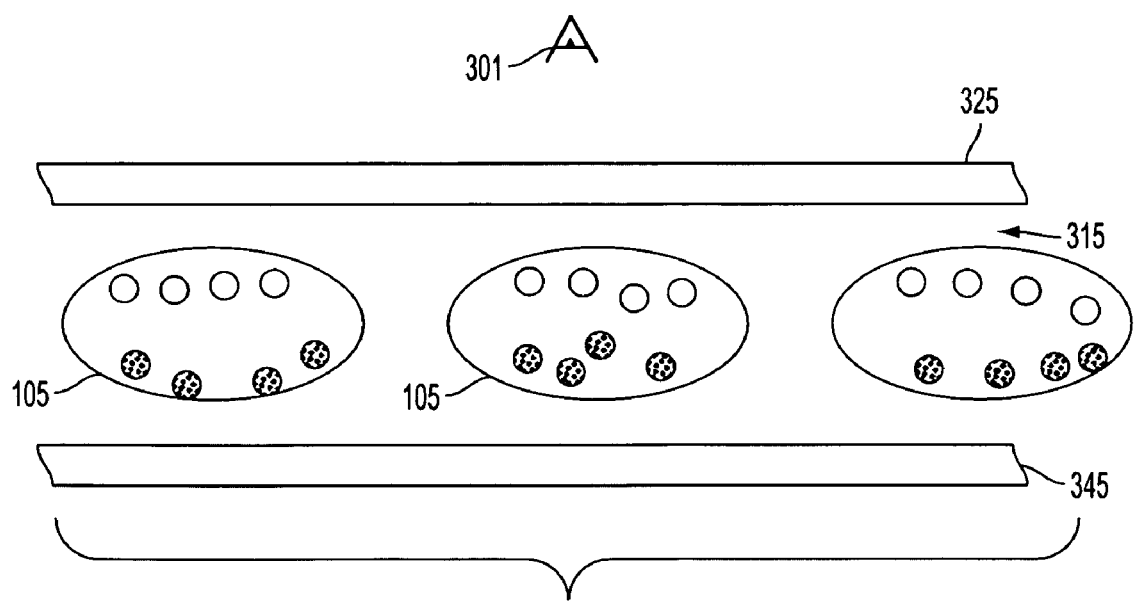

Polymers for first plurality of triboelectrically charged particles 130 and second plurality of triboelectrically charged particles 140 can include polymers having a melting temperature of about 70° C. to about 300° C. Polymers include, but are not limited to, polyethylene and polypropylene. Referring to FIGS. 3A and 3B, a pair of electrodes 325 and 345 can be positioned adjacent a binder layer 315 to apply an electric field. Application of one electric field causes first plurality of triboelectrically charged particles 140 to move such that capsule 105 appears dark, e.g., to absorb light, to an observer 301. Application of another electric field causes second plurality of triboelectrically charged particles 130 to move such that capsule 105 appears light, e.g. to reflect light, to observer 301.

Figure 2:
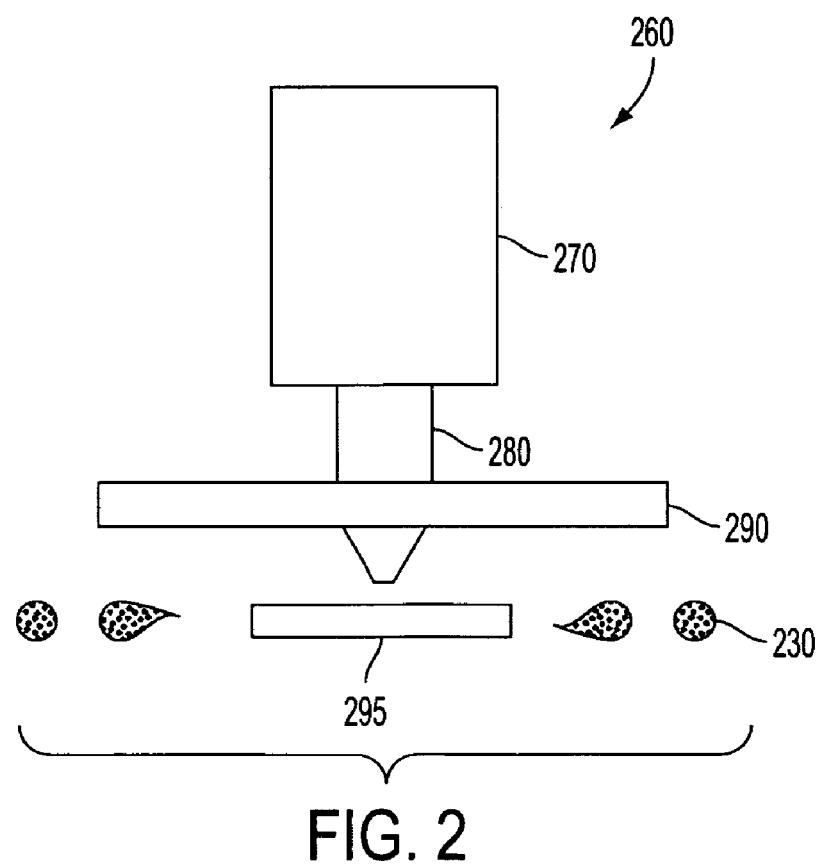
FIG. 2 depicts an exemplary monochrome spinner used to make exemplary eletrophoretic ink particle in accordance with the present teachings.

Referring to FIG. 2, triboelectrically charged particles can be formed, for example, using a monochrome spinner 260. According to various embodiments, triboelectrically charged spheres having a diameter of about 75 µm and less can be formed by forming a polymer melt including a pigment and a polymer. In various embodiments, a non-ionic surfactant can be included. The polymer melt can be housed in a reservoir 270 of monochrome spinner 260. The polymer melt, heated by a shroud heater 290, can be fed from a nozzle 280 to a spinning disk 295. Spinning disk 295 can have a spinning speed of about 1,000 rpm to about 10,000 rpm. Spinning disk 295 can triboelectrically charge and eject spherical particles 230. The resultant charged (either positively or negatively) spheres 230 can then be mixed with a liquid and metal shot, and shaken to form fine triboelectrically charged particles having a diameter of 15 µm and less. One of ordinary skill in the art understands that whether the particles become positively or negatively charged depends on the relative tendencies of the particle material and the spinning disk material to gain or lose electrons.

An exemplary electrophoretic ink capsule and an exemplary method for making the electrophoretic ink capsule will be described. It is to be understood that the disclosed examples are exemplary and in no way are intended to limit the scope of the invention.

EXAMPLE

According to various embodiments, an electrophoretic ink capsule can include a first plurality of triboelectrically charged particles that can absorb light, such as, for example, dark and/or black particles, and a second plurality of triboelectrically charged particles that can reflect light, such as, for example, light and/or white particles. The black particles comprised, for example, an extruded black pigmented wax including 20 wt % Ferro 6331 black pigment (Ferro Corp., Cleveland, Ohio)+0.3 wt % Igepal DM970 (Aldrich, St. Louis, Mo.)+79.7% Polywax 2000 (Baker Petrolite, Sugar Land, Tex.). The black pigmented wax was melted at about 150° C. and mechanically stirred for two hours at about 1200-1500 rpm. The wax melt was then fed into a monochrome spinner with a disk spinning at about 5930 rpm, a shroud temperature of about 170° C., and a nozzle temperature of about 125° C. The resultant black spheres were about 75 µm in diameter. Furthermore, the black spheres were positively charged by tribocharging.

Approximately 5 grams of the black spheres were then mixed with 15 grams of Isopar M and 20 grams of stainless steel shot, about 5 mm in diameter, in a 30 ml polypropylene bottle. The bottle was shaken in a paint shaker for approximately 90-120 minutes. The resultant triboelectrically charged black particles were about 15 µm in diameter.

The white particles comprised, for example, an extruded white pigmented wax including 30 wt % Dupont R104 $TiO_2$ pigment+70 wt % Polywax 2000. The white pigmented wax was melted at about 150° C. and mechanically stirred for two hours at about 1200-1500 rpm. The wax melt was then fed into a monochrome spinner with a disk spinning at about 5930 rpm, a shroud temperature of about 170° C., and a nozzle temperature of about 125° C. The resultant white spheres were about 75 µm in diameter and negatively charged by tribocharging.

Approximately 5 grams of the white spheres were then mixed with 15 grams of Isopar M and 20 grams of zirconia shot, about 5 mm in diameter, in a 30 ml polypropylene bottle. The bottle was shaken in a paint shaker for approximately 90-120 minutes. The resultant triboelectrically charged white particles were about 15 µm in diameter.

The triboelectrically charged black and white particles were then encapsulated using a complex coacervation process under high shear provided by an overhead mixer with a 3-blade impeller. A 40 mL particle mixture of triboelectrically charged black and white particles in Isopar M was prepared, the triboelectrically charged black and white particles comprising about 21 wt % of the mixture. The ratio of black particles to white particles was about 1.5:1. An encapsulation solution was also prepared by mixing 100 mL of a 6.6% gelatin solution, 400 mL of water, and 100 mL of a 6.6 gum Arabic solution. The pH of the encapsulation solution was adjusted to about 4.5 by addition of a dilute acetic acid solution. The encapsulation solution was then heated to about 40° C. The particle mixture was added to the encapsulation mixture and allowed to cool to room temperature. The resultant capsules were crosslinked with gluteraldenhyde, washed with water, and wet-sieved to isolate capsules approximately 200 µm or less.

Figure 4:
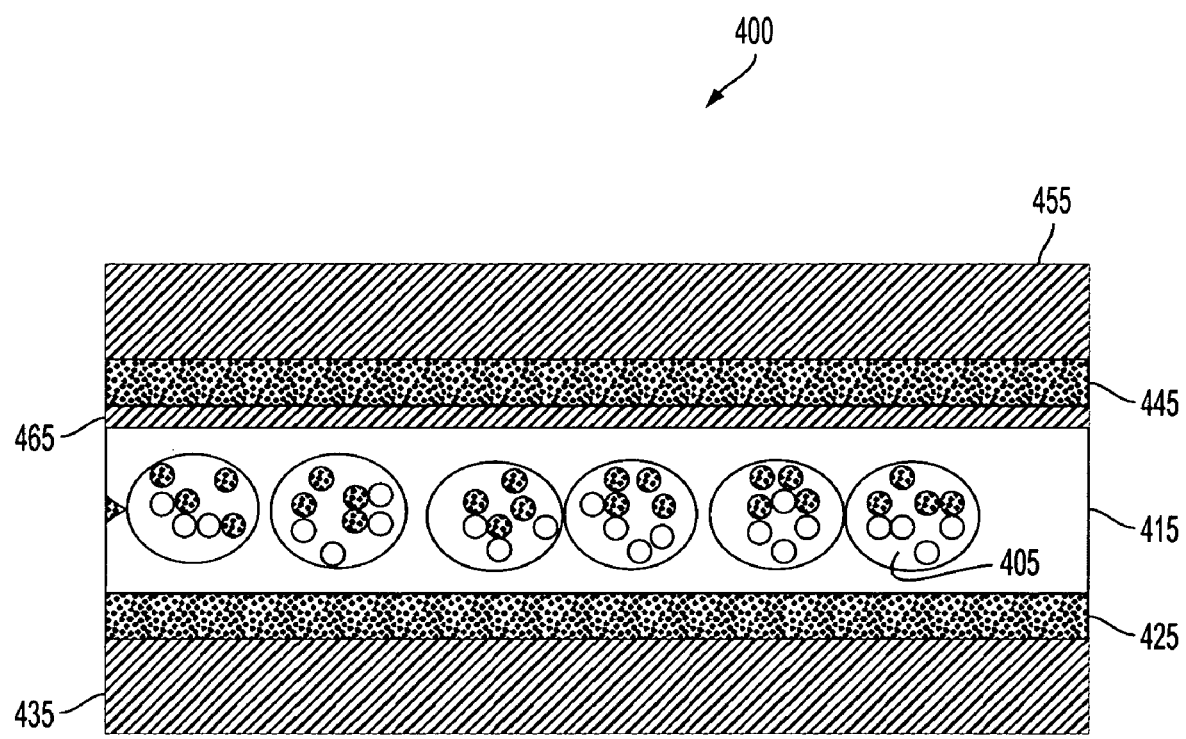
FIG. 4 depicts an exemplary electrophoretic display including exemplary eletrophoretic ink particle in accordance with the present teachings.

Referring to FIG. 4, an exemplary electrophoretic display 400 is shown. According to various embodiments, electrophoretic display 400 can include a plurality of electrophoretic ink capsules 405 embedded in a PVA layer 415. Electrophoretic ink capsules 405 can include a shell encapsulating a plurality of triboelectrically charged dark particles, such as, for example, black particles, a plurality of triboelectrically charged light particles, such as, for example, white particles, and a non-polar liquid. Although depicted as a single layer, PVA layer 415 can comprise several layers of PVA. PVA layer 415 can be disposed on a first conductive indium-tin-oxide (ITO) layer 425. First conductive ITO layer 425 can be disposed on a first substrate 435, such as, for example, a Mylar substrate. Electrophoretic display 400 can further include a second conductive ITO layer 445 disposed on a second substrate 455, such as, for example, a Mylar substrate. Second conductive ITO layer 445 can be bonded to PVA layer 415 by, for example, a layer of glue 465. According to various embodiments, electrophoretic display 400 can have a switching field of about 2 Volts/µm and a switching speed of 15 to 20 Hertz.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrophoretic ink capsule comprising:
   a first plurality of triboelectrically charged particles;
   a second plurality of triboelectrically charged particles;
   a non-polar liquid; and
   a shell encapsulating the first plurality of particles, the second plurality of particles, and the non-polar liquid,
   wherein the first plurality of triboelectrically charged particles move in a first direction within the non-polar liquid in response to an applied electric field and the second plurality of triboelectrically charged particles move in an opposite direction within the non-polar liquid in response to the applied electric field; and
   wherein the electrophoretic ink capsule has an electrical conductivity of about $10^{-11}$ $Scm^{-1}$ or less.

2. The electrophoretic ink capsule of claim 1, wherein the first plurality of triboelectrically charged particles comprise a black pigmented polyethylene and wherein the second plurality of particles comprise a white pigmented polyethylene.

3. The electrophoretic ink capsule of claim 2, wherein at least one of the a black pigmented polyethylene and the white pigmented polyethylene has a melting temperature between about 70° C. and 300° C.

4. The electrophoretic ink capsule of claim 1, wherein ratio of first particles to second particles in about 1.5 to 1 or less.

5. The electrophoretic ink capsule of claim 1, wherein the non-polar liquid is a hydrocarbon paraffin oil.

6. The electrophoretic ink capsule of claim 1, wherein the shell comprises a cross-linked gum Arabic gelatin.

7. The electrophoretic ink capsule of claim 1, wherein a diameter of the electrophoretic ink capsule is about 200 μm or less.

8. An electrophoretic display comprising:
a first substrate;
a conductive layer on the first substrate; and
a first polyvinyl acetate layer comprising a plurality of electrophoretic ink capsules having an electrical conductivity of about $10^{-11}$ Scm$^{-1}$ or less, and wherein the electrophoretic ink capsules comprise a shell encapsulating a plurality of triboelectrically charged dark particles, a plurality of triboelectrically charged light particles, and a non-polar liquid.

9. The electrophoretic display of claim 8 further comprising a second polyvinyl acetate layer disposed between the conductive layer and the first polyvinyl acetate layer.

10. The electrophoretic display of claim 8 further comprising:
a glue layer on the first polyvinyl acetate layer;
a second conductive layer on the glue layer; and
a second substrate on the second conductive layer.

11. The electrophoretic display of claim 10, wherein at least one of the first substrate and the second substrate comprises a Mylar film.

12. The electrophoretic display of claim 10, wherein at least one of the first conductive layer and the second conductive layer comprises an indium tin oxide layer.

13. The electrophoretic display of claim 8, wherein a switching field is about 2 V/μm or less.

* * * * *